Patented Jan. 2, 1934

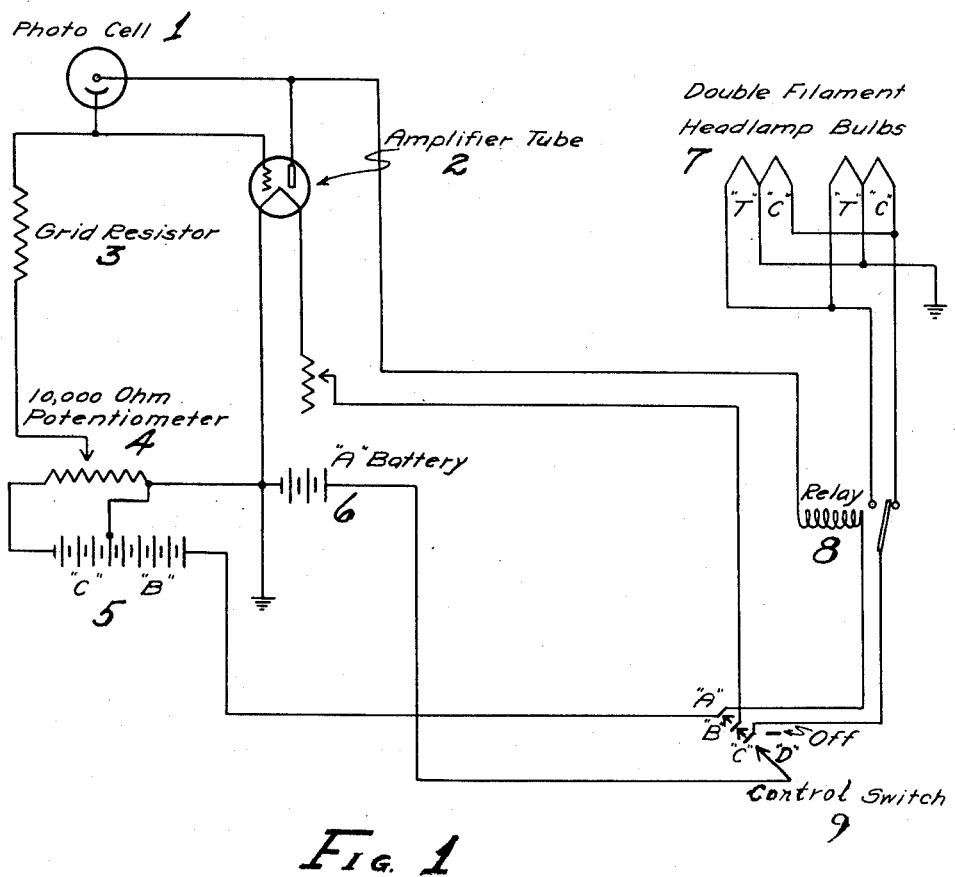

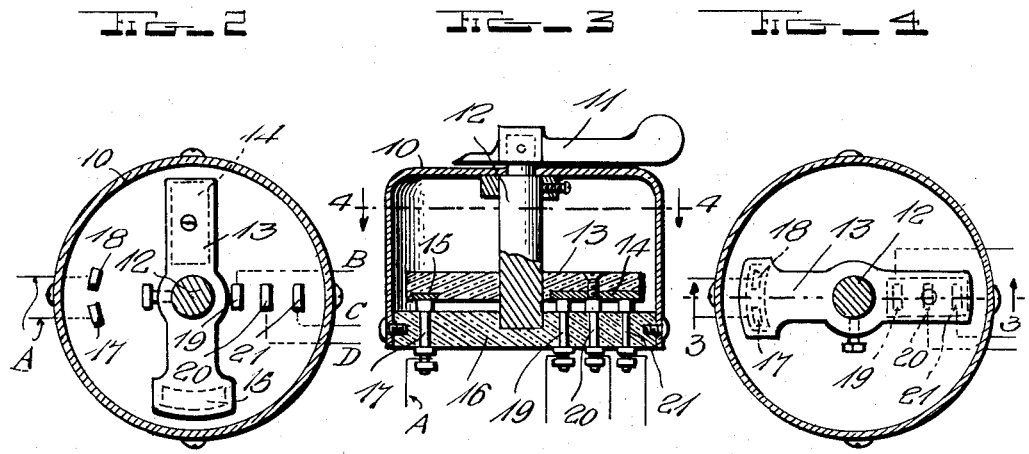
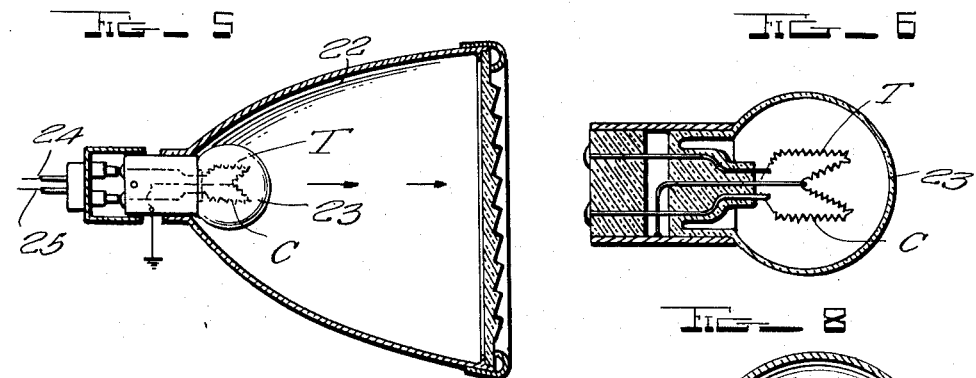
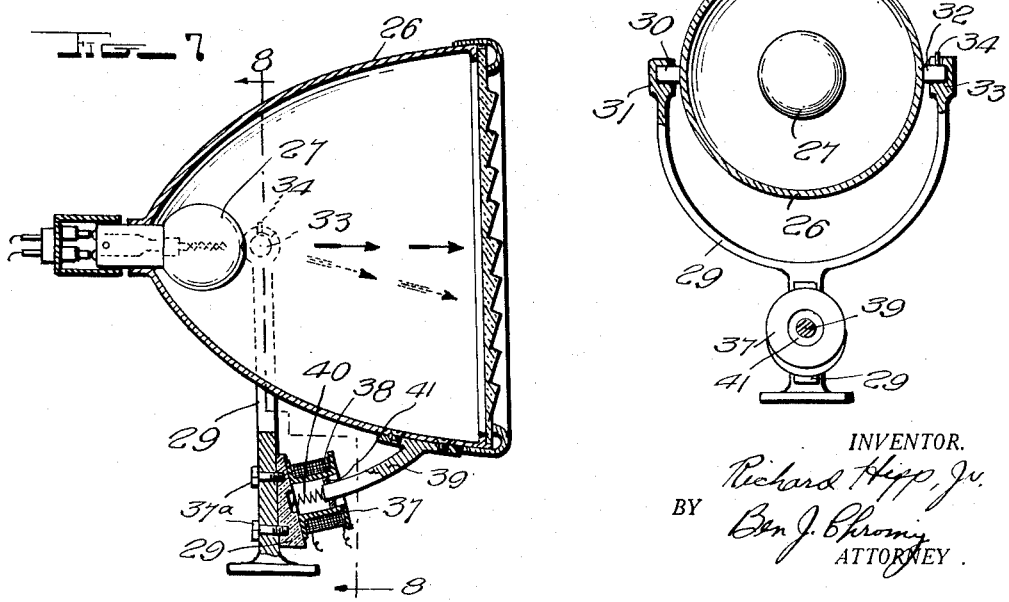

1,942,289

UNITED STATES PATENT OFFICE 1,942,289

VEHICLE HEADLIGHT CONTROL APPARATUS

Richard Hipp, Jr., Pomaria, S. C.

Application June 27, 1931. Serial No. 547,427

6 Claims. (Cl. 171—97)

This invention relates to light sensitive cell circuit arrangements generally. More particularly this invention relates to a system for controlling the circuits of an illumination system in accordance with the illumination of another system.

An object of this invention is to provide an arrangement whereby the lights of a vehicle may be deflected to the side of the highway when another vehicle is approached.

Another object of this invention is to provide an arrangement whereby auxiliary filaments of the headlights of a vehicle are connected into circuit automatically as another vehicle is approached.

Still another object of this invention is to provide an arrangement whereby the beam or beams of light projected from vehicle lights may be shifted in direction upon the approach of another vehicle.

A further object of this invention is to provide a light sensitive cell circuit arrangement adapted to control the operation of a plural filament lamp in accordance with the illumination of the light sensitive cell.

Still a further object of this invention is to provide a light sensitive cell circuit arrangement adapted to automatically connect into circuit an auxiliary filament of a vehicle headlight in place of the main filament whereby the beam of light rays transmitted from the headlight is deflected to the side of the highway as the vehicle approaches another vehicle.

Another object of this invention is to provide an arrangement whereby the headlight or headlights of a vehicle are tilted through the operation of a photoelectric or light sensitive cell and an electro-magnet arrangement as the vehicle approaches another vehicle.

Other features and objects of this invention will be more fully set forth in the following specification and the claims.

In this invention I have provided an arrangement employing a light sensitive cell and a relay arrangement whereby the light rays of a vehicle, such as an automobile, are automatically deflected to one side of the highway when the vehicle approaches another vehicle. This is accomplished by having the light sensitive cell control the circuit of a relay arrangement which is connected either to an auxiliary filament of the headlight of the vehicle or to mechanically tilt the headlight of the vehicle as another vehicle is approached. The light sensitive cell may be either of the type that is most sensitive to the red rays or of the type sensitive to the violet rays, and it is accordingly not desired to limit this invention to use with radiations confined to the luminous or semi-luminous part of the spectrum. This invention may be practiced with the invisible infra-red rays or rays of frequencies lower than the visible rays as well as with the ultra violet or higher frequency rays. These visible and invisible rays of very high frequency are herein referred to as corpuscular radiations.

This invention will be more fully understood from the specification and the accompanying drawings, in which:

Fig. 1 is a schematic circuit diagram.

Figs. 2, 3 and 4 are detail views of a switch embodied in this invention.

Figs. 5 and 6 are detail views of a plural filament lamp headlight and reflector embodied in this invention, and Figs. 7 and 8 are illustrations of a modified form of vehicle headlight.

Reference numeral 1 of Fig. 1 of the drawings designates a photoelectric cell which may be of the alkali type or of the alkali hydride type in cases where the electron emitting cathode light sensitive cell is desired, especially in cases where it is preferred that the cell be more sensitive to the violet and ultra violet rays. Where it is desired that the photoelectric cell be most sensitive to the red and infra-red rays the sulphur cæsium cathode type may be employed. The cell 1 is connected between the control grid and plate electrodes of the amplifier tube or electron discharge device 2. A grid resistor or grid leak 3 of relatively high resistance is connected to the control grid of the tube 2 and to the movable contact of the potentiometer 4. The potentiometer 4 is connected across the "C" section of the source of current supply 5. The cathode or heater electrode of the tube 2 is connected to the source of current supply 6 and also to the common point of the "B" and "C" current supply 5. The sources of current supply 5 and 6 may be in any convenient form, such as batteries or generators, or they may be suitably combined into one source.

The photoelectric cell 1 may also be connected into the grid-cathode circuit of the tube 2 across the resistor 3 or in any other convenient manner. In cases where the selenium type of light reactive cell is employed it may be more desirable to connect it directly into the grid-cathode circuit of the tube, inasmuch as this type of cell operates as a resistance varying instead of an electron emitting device.

A relay 8 is connected to the anode of the tube 2 and the contact A of the switch 9. Contact A of the switch 9 is also connected to the positive terminal of the source of current supply 5. The rheostat 10 for controlling the cathode or heater current of the tube 2 is connected to the contact B of switch 9 and the armature of the relay 8 is connected to the contact C. Battery 6 which is employed to heat the cathode of the tube 2 and the filaments T and C of the headlamp bulbs 7 is connected to the contact C of the switch 9. The operation and construction of a preferred form of this switch is more clearly illustrated in Figs. 2, 3 and 4 of the drawings.

In Fig. 2 of the drawings reference numeral 10 designates the housing for switch 9. This housing may be made in various shapes or forms as required in each particular case, since it is employed to protect the switch contacts. A switch lever 11 (Fig. 3 of the drawings) is mounted externally of the casing upon the member 12 to provide means for manipulating a contact carrying block 13 which is mounted upon the member 12 inside of the housing.

Two contacts 14 and 15 of metal, preferably copper, brass or the like, are carried by the insulator block 13 which may be of synthetic porcelain, hard rubber, composition, phenol condensation products or the like. Additional contacts 17, 18, 19, 20 and 21 are mounted upon the base 16 of insulating material. Contacts 17 and 18 form the A contacts of Fig. 1 of the drawings and are connected by the contacting block 15 when the switch is in the operative position as illustrated in Fig. 4 of the drawings. The contacting block 14 connects the contacts 19, 20 and 21 in the operative position of the switch; these contacts correspond to contacts B, C and D, respectively, of Fig. 1 of the drawings. It is, of course, seen that one of the contacts 19, 20 and 21 may be omitted by employing the plate 14 in the place thereof.

Figs. 5 and 6 of the drawings illustrate a form of lamp and reflector that may be employed. The reflector 22 may be of a form simulating or approaching a paraboloid. The lamp 23 is provided with a pair of filaments T and C which are disposed in such a way that one of them normally will be at or near the focal point or any other optimum point of the reflector so that the beam of light projected by the unit will be substantially straight ahead of the vehicle employing the unit. The other of the filaments is disposed at an off-set position with respect to the focal point of the reflector so that when it is in use the beam of light projected from the unit will be either toward the ground at a relatively short distance ahead of the vehicle or the light will be scatttered in a direction toward the right of the vehicle or toward the side of the highway.

The center of the filaments T C is grounded to the lamp base; the ends of the filaments are connected to the leads 24 and 25 which are connected to the contacts of the relay 8 (Fig. 1).

In operation the photoelectric cell 9 (Fig. 1) is mounted upon the vehicle in a position, preferably upon the left side, to receive light rays transmitted from approaching vehicles. Upon receiving light rays from such vehicles the photo-electric cell causes the plate current of the tube 2 to increase and the relay 8 to connect the filament T of the lamp 7 into the circuit of the current source 6. The filament T is arranged with respect to the reflector 22 (Fig. 5) in such a position that light rays projected from the reflector are deflected and do not produce a glare in the path of the approaching vehicle. The relay 8 may be provided with a small dash pot to cause the armature thereof to return to its normal position more slowly upon the de-energization of the photoelectric cell 1 so that a short interval of time will elapse before the filament C of the lamp 7 is connected into circuit after the lights of the approaching vehicle are no longer intercepted by the photoelectric cell.

In Figs. 7 and 8 of the drawings a modified form of my invention is illustrated wherein the reflector 26, which may be of any desired shape or form suitable for headlights of vehicles, is provided with a single filament lamp 27 and is pivotally mounted upon the Y-shaped member 29. For the purpose of supporting the reflector 26 bearing members 30 and 32 are provided to the side thereof for engaging the sockets 31 and 33, respectively, as illustrated in Fig. 8 of the drawings. A pin 34 is positioned in the bearing 32 to limit the angular movement of the reflector with respect of the support. This pin is operatively positioned in a groove or recess formed in the socket 33.

The electro-magnet 38 which is supported upon the section 35 of member 29 by the screws 37a engaging the magnet spool 37, which is formed to receive the winding of the electro-magnet.

A spring 40 is positioned between the armature 39, which is attached to the reflector 26, and the end of the member 37 that is adjacent to the support 29. This spring is preferably of non-magnetic material. A packing washer 41 of resilient rubber, leather or lead foil covered cord is positioned between inner walls of the spool-shaped member 37 and the armature 39. This packing washer is retained by the armature 39 and serves to prevent this armature from being too rapidly forced from the interior of the member 37 after the winding 38 is de-energized.

The electro-magnet 38 is connected into the circuit shown in Fig. 1 of the drawings in place of the relay winding 8. In this modified form of my invention the filaments of the headlights are not controlled by the relay, the beam of light therefrom being deflected either to the ground or to a side of the highway upon the approach of another vehicle, by the electro-magnet 38, which is energized through the operation of the photo-electric cell 1 (Fig. 1), and moves the headlight through a small angle. The beam of light projected from the headlight under normal conditions is indicated by the solid arrows in Fig. 7. The dotted arrows indicate the direction of the beam of light projected when the reflector is shifted angularly. In this way the headlights of vehicles may be controlled by the lights of approaching vehicles to avoid unnecessary glare.

The reflector 26 is arranged to remain in the deflected position for a short interval of time even after the photoelectric cell 1 (Fig. 1) is no longer energized by the light from the passing vehicle, through the operation of the gasket 41 on the armature 39. This gasket or ring is closely fitted in the interior of the member 37 and will permit the armature 39 to return to its normal position relatively slowly.

Having thus described certain embodiments of my invention in considerable detail, it is, of course, understood that I do not desire to limit the scope thereof to the exact details set forth except in so far as those details may be defined by the appended claims.

What I claim and desire to secure by Letters Patent of the United States is as follows:

1. In apparatus for the control of illumination of vehicle headlights, the combination of vehicle headlights, means for intercepting corpuscular radiations, an electron discharge device having input and output circuits, connections between said input circuit and said means, an electromagnetic device connected to control the operation of said vehicle headlights in accordance with the energization of said means, and a switch connected to control the operation of said electron discharge device and said vehicle headlights simultaneously.

2. In apparatus for the control of vehicle headlights, the combination of a light sensitive cell, amplifying means connected to said cell, a relay connected to said amplifying means, a plural filament lamp connected to be controlled by said relay, and a switch, said switch being connected to control the circuits of said amplifying means, said relay and said lamp simultaneously.

3. In apparatus for the control of vehicle headlights, the combination of a lamp having at least two filaments in off-set positions, one of which is normally connected into circuit, electron discharge device means having input and output circuits associated therewith, means connected to said output circuit for controlling the circuits of said filaments, connections between said input circuit and said light sensitive cell means, current supply means for energizing the circuit of said electron discharge device means and the filaments of said lamp, and switching means for controlling the circuits of said electron discharge device means, said lamp and said current supply means simultaneously.

4. In apparatus for the control of illumination, the combination of an electron discharge device having grid, filament and plate electrodes, input and output circuits connected to said electrodes, a light sensitive cell connected to said input circuit, a relay connected to said output circuit, a source of current supply connected to said filament electrode, a lamp connected to be controlled by said relay and said source of current supply and a switch for interrupting said lamp circuit and said filament circuit at said source of current supply.

5. In apparatus for the control of illumination, the combination of an electron discharge device having grid, filament and plate electrodes, input and output circuits connected to said electrodes, a light sensitive cell connected to said input circuit, a relay connected to said output circuit, a source of current supply connected to said filament electrode, a lamp having a pair of filaments, connections between said filaments whereby lamp filaments may be controlled by the operation of said relay, connections for energizing said lamp filaments from said source of current supply and switch means for interrupting the circuits of said lamp filaments and said electron discharge device filament simultaneously.

6. In apparatus for the control of illumination the combination of a light sensitive cell, a vacuum tube having grid, filament and plate electrodes, connections between said grid electrode and said light sensitive cell, a source of current supply connected to said filament, a lamp having a pair of filaments connected to said source of current supply, a relay connected to the plate electrode of said vacuum tube, said relay having an armature and a pair of contacts associated with said armature, connections between different ones of said contacts and different one of said lamp filaments, connections between said source of current supply and said relay armature, a switch connected to said armature, said relay and said vacuum tube filament for simultaneously controlling the circuits thereof.

RICHARD HIPP, Jr.